United States Patent
You et al.

(10) Patent No.: US 10,681,502 B2
(45) Date of Patent: Jun. 9, 2020

(54) METHODS, USER EQUIPMENT, AND BASE STATION FOR RECEIVING AND TRANSMITTING SINGLE CELL-POINT TO MULTIPOINT (SC-PTM) DATA

(71) Applicant: LG ELECTRONICS INC., Seoul (KR)

(72) Inventors: Hyangsun You, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/760,952

(22) PCT Filed: Sep. 1, 2016

(86) PCT No.: PCT/KR2016/009755
§ 371 (c)(1),
(2) Date: Mar. 16, 2018

(87) PCT Pub. No.: WO2017/047955
PCT Pub. Date: Mar. 23, 2017

(65) Prior Publication Data
US 2018/0262882 A1    Sep. 13, 2018

Related U.S. Application Data

(60) Provisional application No. 62/220,201, filed on Sep. 17, 2015.

(51) Int. Cl.
*H04W 4/06* (2009.01)
*H04W 72/00* (2009.01)
(Continued)

(52) U.S. Cl.
CPC ............ *H04W 4/06* (2013.01); *H04W 72/005* (2013.01); *H04L 5/0012* (2013.01); *H04L 5/0053* (2013.01); *H04W 72/042* (2013.01); *H04W 88/02* (2013.01)

(58) Field of Classification Search
CPC ..... H04W 4/06; H04W 72/005; H04W 88/02; H04W 72/042; H04W 72/0446;
(Continued)

(56) References Cited

U.S. PATENT DOCUMENTS

2010/0027488 A1*  2/2010  Chun .................... H04L 5/0042
                                                               370/329
2012/0195258 A1*  8/2012  Zhou ....................... H04W 4/08
                                                               370/328
(Continued)

FOREIGN PATENT DOCUMENTS

EP           3079421        * 10/2016
WO    WO-2008155739 A2  * 12/2008    ............ H04W 68/02
WO    WO 2015/115825 A1    8/2015

OTHER PUBLICATIONS

Huawei et al., "PDCCH Search Space for SC-PTM Transmission," 3GPP TSG-RAN WG2 #91, R2-153380, Beijing, China, Aug. 24-28, 2015, 3 pages.
(Continued)

*Primary Examiner* — Un C Cho
*Assistant Examiner* — Lalita W Pace
(74) *Attorney, Agent, or Firm* — Birch, Stewart, Kolasch & Birch, LLP

(57) ABSTRACT

Provided are a method and apparatus for transmitting/receiving single cell point to multipoint (SC-PTM) data. Time-frequency resources for the SC-PTM can be set. A frequency resource that may have downlink control information (DCI) scrambled with a corresponding group identifier for each group identifier available in a cell may be set.
(Continued)

A time resource, which may have a DCI scrambled with the corresponding group identifier for each group identifier available in the cell, may be set.

12 Claims, 9 Drawing Sheets

(51) Int. Cl.
*H04L 5/00* (2006.01)
*H04W 72/04* (2009.01)
*H04W 88/02* (2009.01)

(58) Field of Classification Search
CPC .. H04W 72/0453; H04W 4/08; H04L 5/0053; H04L 5/0012
See application file for complete search history.

(56) References Cited

U.S. PATENT DOCUMENTS

| | | | |
|---|---|---|---|
| 2012/0294269 A1 | 11/2012 | Yamada et al. | |
| 2013/0039297 A1* | 2/2013 | Wang | H04W 76/25 370/329 |
| 2013/0094458 A1* | 4/2013 | Sartori | H04W 72/042 370/329 |
| 2013/0114533 A1* | 5/2013 | Ji | H04W 72/1263 370/329 |
| 2013/0148616 A1* | 6/2013 | Takano | H04W 72/121 370/329 |
| 2015/0304821 A1* | 10/2015 | Liu | H04W 4/06 370/312 |
| 2016/0226639 A1* | 8/2016 | Xiong | H04L 5/0053 |
| 2017/0325198 A1* | 11/2017 | Adachi | H04W 4/06 |
| 2017/0325277 A1* | 11/2017 | Fujishiro | H04W 4/06 |
| 2017/0347341 A1* | 11/2017 | Zhang | H04B 7/0689 |
| 2018/0027578 A1* | 1/2018 | Xu | H04L 1/00 370/336 |

OTHER PUBLICATIONS

NEC, "SC-PTM Configuration," 3GPP TSG RAN WG2 Meeting #91, R2-153635, Beijing, China, Aug. 24-28, 2015, pp. 1-5.
Potevio, "Issues of SC-PTM Configuration," 3GPP TSG-RAN WG2 #91, R2-153472, Beijing, China, Aug. 24-28, 2015, pp. 1-3.

* cited by examiner

[P]  RE occupied by CRS of port p ( p∈0, p∈0,1 or p∈0,1,2,3 )

▨  RE occupied by UE-RS of port(s) p ( p∈7, p∈8, p∈7,8 or p∈7,8,11,13 )

◩  RE occupied by UE-RS of port(s) p ( p∈9, p∈10, p∈9,10 or p∈9,10,12,14 )

METHODS, USER EQUIPMENT, AND BASE STATION FOR RECEIVING AND TRANSMITTING SINGLE CELL-POINT TO MULTIPOINT (SC-PTM) DATA

CROSS REFERENCE TO RELATED APPLICATIONS

This application is the National Phase of PCT International Application No. PCT/KR2016/009755, filed on Sep. 1, 2016, which claims priority under 35 U.S.C. 119(e) to U.S. Provisional Application No. 62/220,201, filed on Sep. 17, 2015, all of which are hereby expressly incorporated by reference into the present application.

TECHNICAL FIELD

The present disclosure relates to a wireless communication system and, more particularly, to a method for transmitting or receiving data and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a base station (BS) should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

Provided are a method and apparatus for single cell point to multipoint (SC-PTM) transmission. Time-frequency resources for SC-PTM can be configured. A frequency resource that may have downlink control information (DCI) scrambled with a corresponding group identifier for each group identifier available in a cell may be configured. A time resource that may have a DCI scrambled with the corresponding group identifier for each group identifier available in the cell may be configured.

According to an aspect of the present invention, provided is a method of receiving single cell point to multipoint (SC-PTM) data at a user equipment (UE). The method may include receiving SC-PTM configuration information, attempting to receive a first downlink control channel corresponding to a first group identifier among a plurality of group identifiers on a first physical resource block (PRB) set based on the SC-PTM configuration information, and receiving data of a multimedia broadcast/multicast service (MBMS) session corresponding to the first group identifier through a first downlink data channel based on downlink control information carried by the first downlink control channel.

According to another aspect of the present invention, provided is a method of transmitting single cell point to multipoint (SC-PTM) data at a base station. The method includes transmitting SC-PTM configuration information, transmitting a first downlink control channel corresponding to a first group identifier among a plurality of group identifiers on a first physical resource block (PRB) set based on the SC-PTM configuration information, and transmitting data of a multimedia broadcast/multicast service (MBMS) session corresponding to the first group identifier through a first downlink data channel based on downlink control information carried by the first downlink control channel.

According to another aspect of the present invention, provided is a user equipment (UE) for receiving single cell point to multipoint (SC-PTM) data. The UE includes a radio frequency (RF) unit and a processor configured to control the RF unit. The processor may control the RF unit to receive SC-PTM configuration information. The processor may be configured to attempt to receive a first downlink control channel corresponding to a first group identifier among a plurality of group identifiers on a first physical resource block (PRB) set based on the SC-PTM configuration information. The processor may be configured to control the RF unit to receive data of a multimedia broadcast/multicast service (MBMS) session corresponding to the first group identifier through a first downlink data channel based on downlink control information carried by the first downlink control channel.

According to another aspect of the present invention, provided is a base station for transmitting single cell point to multipoint (SC-PTM) data. The base station may include a radio frequency (RF) unit and a processor configured to control the RF unit. The processor may be configured to control the RF unit to transmit SC-PTM configuration information. The processor may be configured to control the RF unit to transmit a first downlink control channel corresponding to a first group identifier among a plurality of group identifiers on a first physical resource block (PRB) set based on the SC-PTM configuration information. The processor may be configured to control the RF unit to transmit data of a multimedia broadcast/multicast service (MBMS) session corresponding to the first group identifier through a first downlink data channel based on downlink control information carried by the first downlink control channel.

In each aspect of the present invention, the SC-PTM configuration information may include the plurality of group identifiers and PRB set information of each of the plurality of group identifiers.

In each aspect of the present invention, the SC-PTM configuration information may include subframe set information of each of the plurality of group identifiers. The first downlink control channel may be transmitted or received only in a first subframe set corresponding to the first group identifier among a plurality of subframe sets.

In each aspect of the present invention, the first PRB set corresponding to the first group identifier may be frequency hopped within the subframe set corresponding to the first group identifier.

In each aspect of the present invention, each subframe in the first subframe set corresponding to the first group identifier may be divided into a control region and a data region in a time domain, and the first downlink control channel may be transmitted or received in the data region.

In each aspect of the present invention, the plurality of group identifiers may be divided into G group identifier groups and a subframe set for each of the G group identifier groups may be composed of subframes "G-RNTI" mod "G"="k" mod "G", where "G-RNTI" indicates a group identifier and "k" indicates a subframe number.

Each aspect of the present invention are only a part of the preferred embodiments of the present invention, and various embodiments based on technical features of the present invention may be devised and understood by the person with ordinary skill in the art based on the detailed description of the present invention.

Advantageous Effects

According to the present disclosure, uplink/downlink signals may be efficiently transmitted/received. Therefore, the overall throughput of a wireless communication system is improved.

According to the present invention, it is possible to efficiently perform critical communication.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure, illustrate embodiments of the present disclosure and together with the description serve to explain the principle of the present disclosure.

MODE FOR CARRYING OUT THE INVENTION

Figure 1:
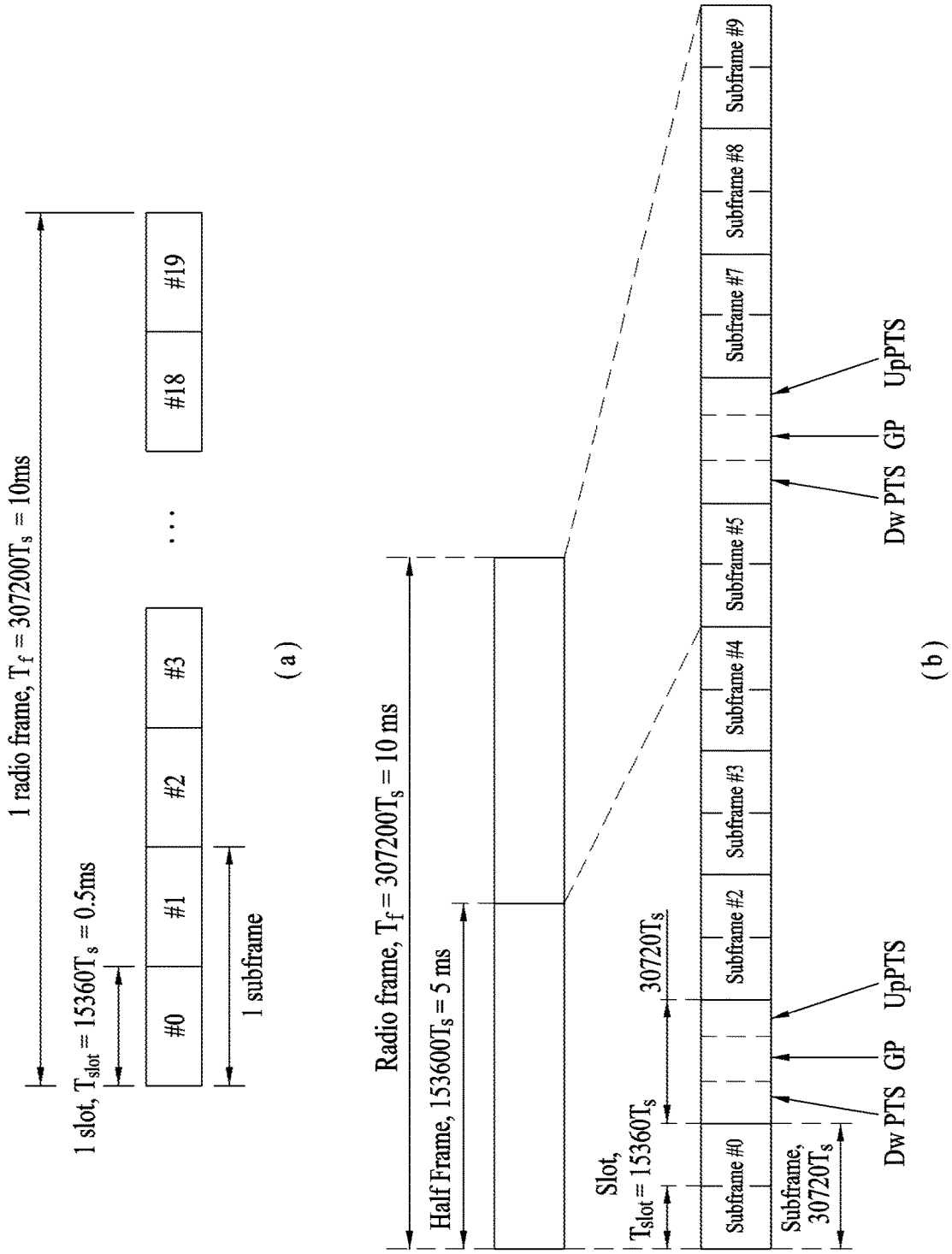
FIG. 1 illustrates an exemplary structure of a radio frame used in a wireless communication system.

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the disclosure. The following detailed description includes specific details in order to provide a thorough understanding of the present disclosure. However, it will be apparent to those skilled in the art that the present disclosure may be practiced without such specific details.

In some instances, known structures and devices are omitted or are shown in block diagram form, focusing on important features of the structures and devices, so as not to obscure the concept of the present disclosure. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present disclosure is applied to 3GPP LTE/LTE-A. However, the technical features of the present disclosure are not limited thereto. For example, although the following detailed description is given based on a mobile communication system corresponding to a 3GPP LTE/LTE-A system, aspects of the present disclosure that are not specific to 3GPP LTE/LTE-A are applicable to other mobile communication systems.

For example, the present disclosure is applicable to contention based communication such as Wi-Fi as well as non-contention based communication as in the 3GPP LTE/LTE-A system in which an evolved Node B (eNB) allocates a DL/UL time/frequency resource to a user equipment (UE) and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In the present disclosure, a UE may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present disclosure, a BS will be referred to as an eNB.

In the present disclosure, a node refers to a fixed point capable of transmitting/receiving a radio signal through communication with a UE. Various types of eNBs may be used as nodes irrespective of the terms thereof. For example, a BS, a node B (NB), an eNB, a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present disclosure, a cell refers to a prescribed geographic region to which one or more nodes provide a communication service. Accordingly, in the present disclosure, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. For a detailed CSI-RS configuration, refer to documents such as 3GPP TS 36.211 and 3GPP TS 36.331.

Meanwhile, a 3GPP LTE/LTE-A system uses the concept of a cell to manage a radio resource. A cell associated with the radio resource is different from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present disclosure, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present disclosure, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present disclosure, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | — |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
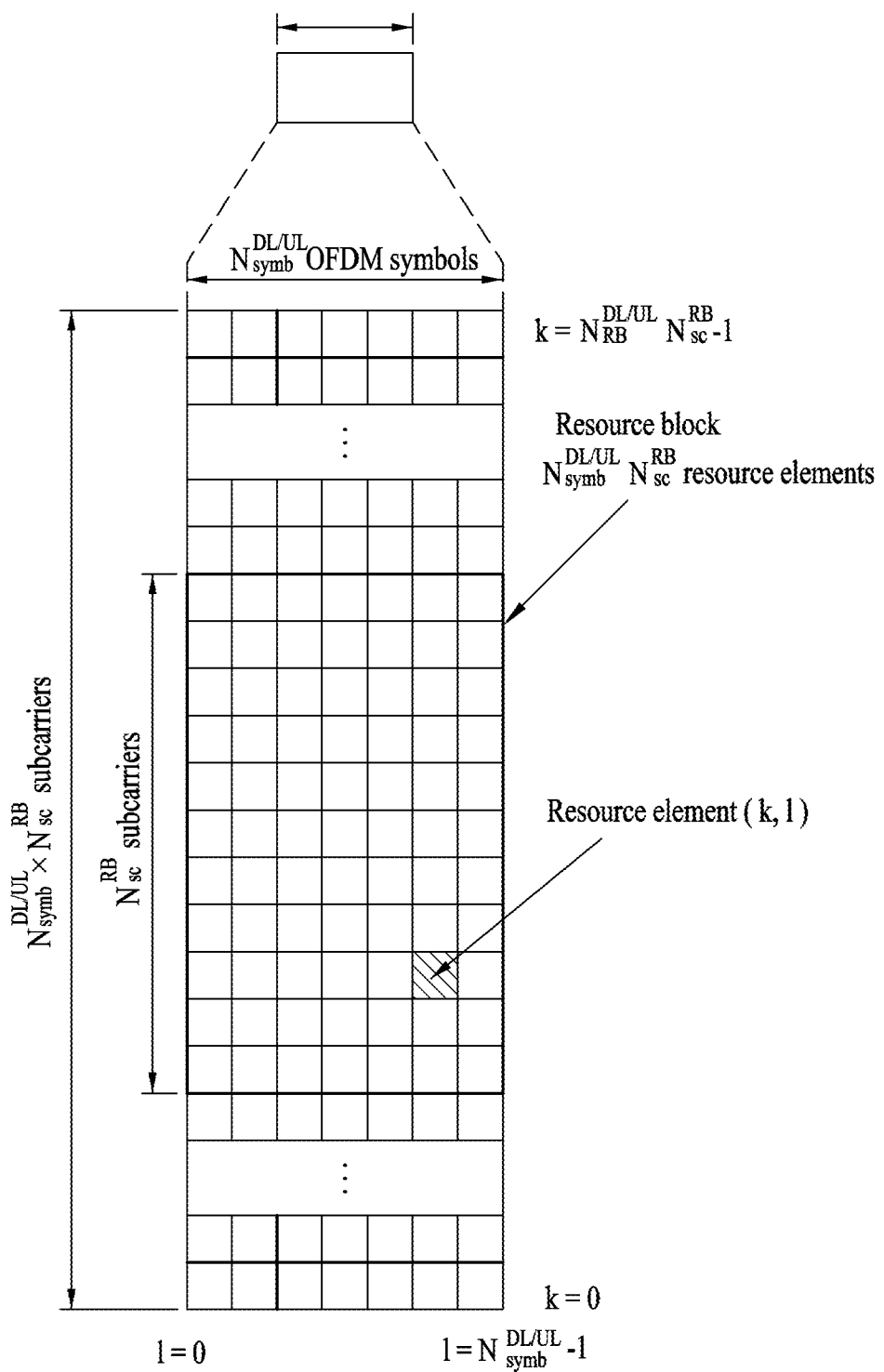
FIG. 2 illustrates an exemplary structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present disclosure are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{RB} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
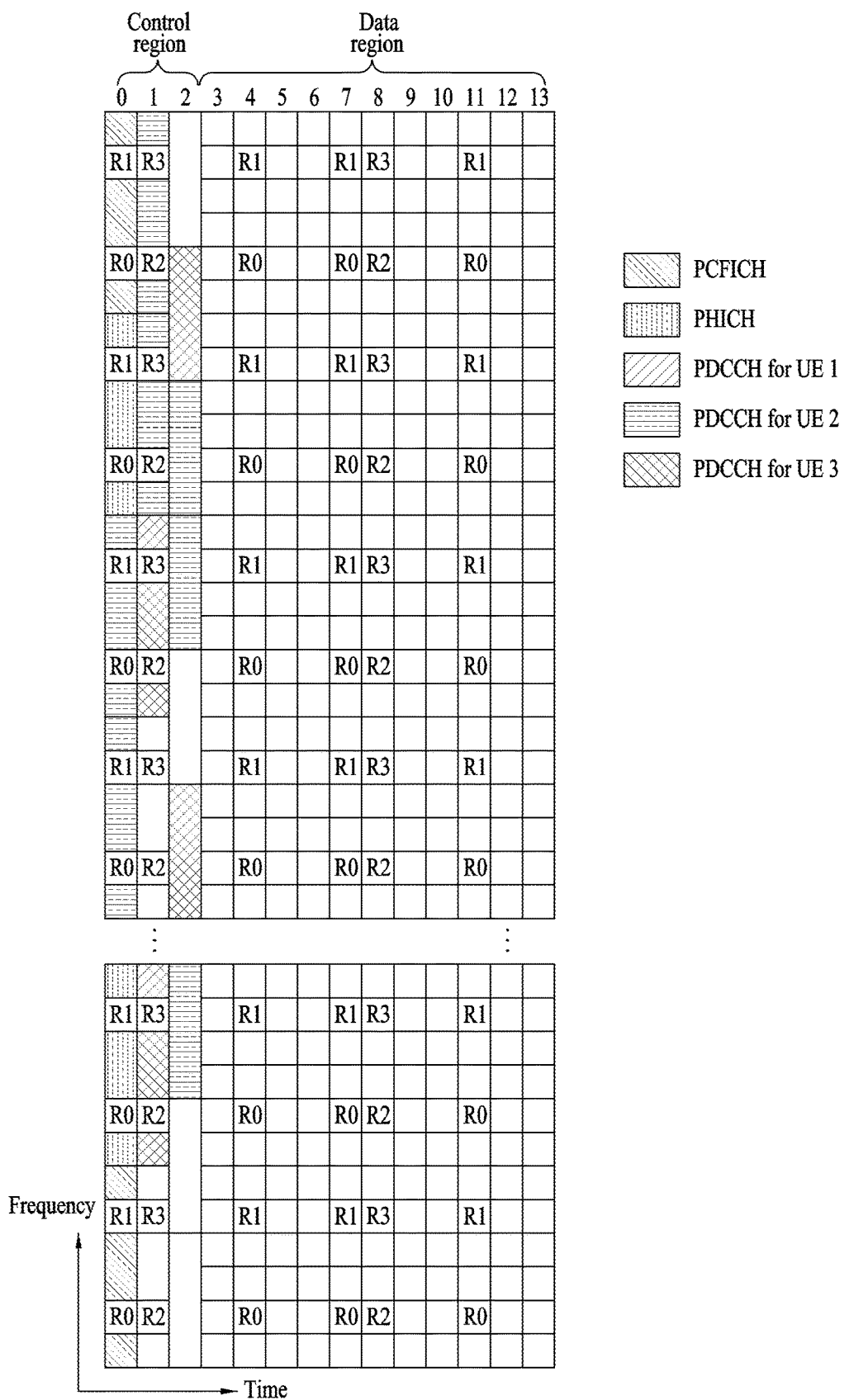
FIG. 3 illustrates an exemplary structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

A set of OFDM symbols available for the PDCCH at a subframe is given by the following Table.

per-subframe basis. Two types of logical channels, that is, a multicast traffic channel (MTCH) and a multicast control channel (MCCH), are multiplexed and mapped to an MCH which is a transport channel. The MTCH is a logical channel used to transmit MBMS data for a specific multimedia broadcast/multicast service (MBMS). When a large number of services is provided in an MBSFN area, there may be a plurality of MTCH configurations. The MCCH is a logical channel used to carry control information related to reception of a specific MBMS. One MCCH is present in each MBSFN area.

An MBMS service means an MBMS bearer service provided through an MBMS point to multimedia radio bearer (MRB). In general, control information related to only UEs supporting the MBMS is separated as much as possible from unicast control information. Most MBMS control information is provided on the MCCH which is a logical channel specific to MBMS common control information. An eNB employs one MCCH logical channel per MBMSFN region. If a network configures a plurality of MBSFN areas, a UE is configured to obtain MBMS control information from MCCHs and to identify whether services to be received thereby are ongoing. The MCCH carries an MBSFN area configuration message indicating ongoing MBMS sessions as well as (corresponding) radio resource configurations. That is, the MBSFN area configuration message includes MBMS control information operable in the MBSFN area. For each MBSFN area included in system information block type 13, a network configures an MCCH for identifying a corresponding MBSFN area and signals the MBSFN area configuration message. The MBSFN area is identified by an MBSFN area ID in system information block type 13. In terms of mobility, when a source cell and a target cell broadcast the same value as an MBSFN area ID,

TABLE 3

| Subframe | Number of OFDM symbols for PDCCH when $N^{DL}_{RB} > 10$ | Number of OFDM symbols for PDCCH when $N^{DL}_{RB} \leq 10$ |
| --- | --- | --- |
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as multicast broadcast single frequency network (MBSFN) subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

MBSFN is supported for a multicast channel (MCH) transport channel. Multiplexing of transport channels using MBSFN and non-MBSFN transmission is performed on a a UE considers that the MBSFN areas are continuous. A restricted amount of MBMB control information associated with information necessary to acquire MCCH(s) is provided on a broadcast control channel (BCCH).

If a UE is receiving an MBMS or is interested in receiving an MBMS, the UE applies a system information acquisition and change monitoring process to obtain parameters for an MBMS operation and applies the parameters obtained from the system information only for the MBMS operation for a corresponding cell. For the MBMS, the following definitions are introduced.

MBSFN synchronization area: Area of a network in which all eNBs may be synchronized and MBSFN transmission may be performed. MBSFN synchronization areas may support one or more MBSFN areas. On a given frequency layer, one eNB belongs to one MBSFN synchronization area. MBSFN synchronization areas are independent of definition of MBSFN service areas.

MBSFN transmission or transmission in MBSFN mode: Simulcast transmission technology realized by simultaneous transmission of an identical waveform from a plurality of cells. MBSFN transmission from a plurality of cells in an MBSFN area is shown as a single transmission by a UE.

MBSFN area: An MBSFN area is composed of a group of coordinated cells in order to achieve MBSFN transmission in an MBSFN synchronization area of a network. Except for MBSFN area reserved cells, all cells in the MBSFN area contribute to corresponding MBSFN transmission and advertise such availability. Upon knowing which MBSFN area applies to service(s) which the UE is interested in receiving, the UE considers only a subset of configured MBSFN areas.

MBSFN area reserved cell: cell which does not contribute to MBSFN transmission in the MBSFN area. The cell may be allowed to transmit for other services with limited power on resources configured for corresponding MBSFN transmission.

Synchronization sequence: each SYNC PDU includes a timestamp indicating a start time of the synchronization sequence. For an MBSM service, each synchronization sequence has the same duration configured in a broadcast multicast service center (BM-SC) and a multi-cell/multicast coordination entity (MCE).

Synchronization period: The synchronization period provides a time reference indicating a start time of each synchronization sequence. The timestamp provided in each SYNC PDU is a relative value which refers to the start time of the synchronization period and the duration of the synchronization period may be configured.

A transport channel MCH is mapped to a physical multicast channel (PMCH). The PMCH may be transmitted only in the MBSFN area of an MBSFN subframe. When MBSFN subframes for a PMCH are configured, an eNB transmits the PMCH in the MBSFN area of the corresponding MBSFN subframes, and a UE assumes that the PMCH is present in the MBSFN area of the corresponding MBSFN subframes. A PMCH-information list is provided to specify configurations of all PMCHs of the MBSFN area. Information provided for an individual PMCH includes configuration parameters of sessions carried by the corresponding PMCH.

In E-UTRAN, the MBMS is provided by only operation (MBSFN) of a single-frequency network mode on a frequency layer (a collection of cells supporting both unicast and MBSFN transmission, that is, a collection of MBMS/unicast-mixed cells) shared with non-MBMS services.

The PCFICH carries a control format indicator (CFI), which indicates any one of values of 1 to 3. For a downlink system bandwidth $N^{DL}_{RB}>10$, the number 1, 2 or 3 of OFDM symbols which are spans of DCI carried by the PDCCH is given by the CFI. For a downlink system bandwidth $N^{DL}_{RB}\leq 10$, the number 2, 3 or 4 of OFDM symbols which are spans of DCI carried by the PDCCH is given by CFI+1.

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

TABLE 4

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

Other DCI formats in addition to the DCI formats defined in Table 4 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

For example, a transmission mode is semi-statically configured for the UE by a higher layer so that the UE may receive a PDSCH transmitted in accordance with one of a plurality of transmission modes which are previously defined. The UE attempts to decode a PDCCH using DCI formats only corresponding to its transmission mode. In other words, in order to maintain UE operation load according to blind decoding attempt, at a certain level or less, all DCI formats are not searched by the UE at the same time. Table 5 illustrates transmission modes for configuring multi-antenna technology and DCI formats for allowing a UE to perform blind decoding at the corresponding transmission mode. Particularly, Table 5 illustrates a relation between PDCCH and PDSCH configured by C-RNTI (Cell RNTI (Radio Network Temporary Identifier)).

TABLE 5

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or Transmit diversity |
| Mode 5 | DCI format 1A | Common and UE specific by C-RNTI | Transmit diversity |
| | DCI format 1D | UE specific by C-RNTI | Multi-user MIMO |
| Mode 6 | DCI format 1A | Common and UE specific by C-RNTI | Transmit diversity |
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
| | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
| | DCI format 2C | UE specific by C-RNTI | Up to 8 layer transmission, ports 7-14 or single-antenna port, port 7 or 8 |

TABLE 5-continued

| Transmission mode | DCI format | Search Space | Transmission scheme of PDSCH corresponding to PDCCH |
|---|---|---|---|
| Mode 10 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2D | UE specific by C-RNTI | Up to 8 layer transmission, ports 7-14 or single antenna port, port 7 or 8 |

Although transmission modes 1 to 10 are listed in Table 5, other transmission modes in addition to the transmission modes defined in Table 5 may be defined.

Referring to Table 5, a UE configured to a transmission mode 9, for example, tries to decode PDCCH candidates of a UE-specific search space (USS) to a DCI format 1A, and tries to decode PDCCH candidates of a common search space (CSS) and the USS to a DCI format 2C. The UE may decode a PDSCH in accordance with DCI based on the DCI format successfully decoded. If DCI decoding from one of a plurality of PDCCH candidates to the DCI format 1A is successfully performed, the UE may decode the PDSCH by assuming that up to 8 layers from antenna ports 7 to 14 are transmitted thereto through the PDSCH, or may decode the PDSCH by assuming that a single layer from the antenna port 7 or 8 is transmitted thereto through the PDSCH.

For example, a transmission mode is semi-statically configured for the UE by a higher layer so that the UE may receive a PDSCH transmitted in accordance with one of a plurality of transmission modes which are previously defined. The UE attempts to decode a PDCCH using DCI formats only corresponding to its transmission mode. In other words, in order to maintain UE operation load according to blind decoding attempt, at a certain level or less, all DCI formats are not searched by the UE at the same time.

In addition to the PDCCH decoded with the CRC scrambled by the C-RNTI illustrated in Table 5, a PDCCH decoded with CRC scrambled with a semi-persistent scheduling C-RNTI (SPS C-RNTI), a temporary C-RNTI, an SI-RNTI, a P-RNTI or an RA-RNTI may be defined.

TABLE 6

| DCI format | Search Space | Transmission scheme of PDSCH corresponding to PDCCH |
|---|---|---|
| DCI format 1C | Common | If the number of PBCH antenna ports is one, Single-antenna port, port 0 is used, otherwise Transmit diversity |
| DCI format 1A | Common | If the number of PBCH antenna ports is one, Single-antenna port, port 0 is used, otherwise Transmit diversity. |

TABLE 7

| DCI format | Search Space | Transmission scheme of PDSCH corresponding to PDCCH |
|---|---|---|
| DCI format 1C | Common | If the number of PBCH antenna ports is one, Single-antenna port, port 0 is used, otherwise Transmit diversity |
| DCI format 1A | Common | If the number of PBCH antenna ports is one, Single-antenna port, port 0 is used, otherwise Transmit diversity |

TABLE 8

| DCI format | Search Space | Transmission scheme of PDSCH corresponding to PDCCH |
|---|---|---|
| DCI format 1C | Common | If the number of PBCH antenna ports is one, Single-antenna port, port 0 is used, otherwise Transmit diversity |
| DCI format 1A | Common | If the number of PBCH antenna ports is one, Single-antenna port, port 0 is used, otherwise Transmit diversity |

Table 6 shows a relation between a PDCCH and a PDSCH configured by an SI-RNTI, which should be searched in a common search space. Table 7 shows a relation between a PDCCH and a PDSCH configured by a P-RNTI, which should be searched in a common search space. Table 8 shows a relation between a PDCCH and a PDSCH configured by an RA-RNTI, which should be searched in a common search space.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

A DCI format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as a search space (SS). SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The following table shows an example of aggregation levels for defining SSs.

TABLE 9

| Type | Search space $S^{(L)}_k$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

For each serving cell, on which a PDCCH is monitored, CCEs corresponding to PDCCH candidate m of a search space $S^{(L)}_k$ are given by "$L*\{Y_k+m'\} \mod \text{floor}(N_{CCE,k}/L)\}+i$". Here, $i=0, \ldots, L-1$. For the common search space, $m'=m$. For the PDCCH UE specific search space, for the serving cell on which the PDCCH is monitored, if the monitoring UE is configured with carrier indicator field, then $m'=m+M^{(L)}*n_{CI}$ (where, $n_{CI}$ is the carrier indicator field (CIF) value), else if the monitoring UE is not configured with carrier indicator field, then $m'=m$ (where $m=0, 1, \ldots, M^{(L)}-1$). $M^{(L)}$ is the number of PDCCH candidates to monitor with an aggregation level L in the given search space. The carrier aggregation field value may be equal to a serving cell index ServCellIndex. For the common search spaces, $Y_k$ is set to 0 for the two aggregation levels L=4 and L=8. For the UE-specific search space $S^{(L)}_k$ at an aggregation level L, the variable $Y_k$ is defined by "$Y_k=(A \cdot Y_{k-1}) \mod D$", where, $Y_{-1}=n_{RNTI} \neq 0$, A=39827, D=65537 and k=floor $(n_s/2)$, and $n_s$ is the slot number within a radio frame.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Figure 4:
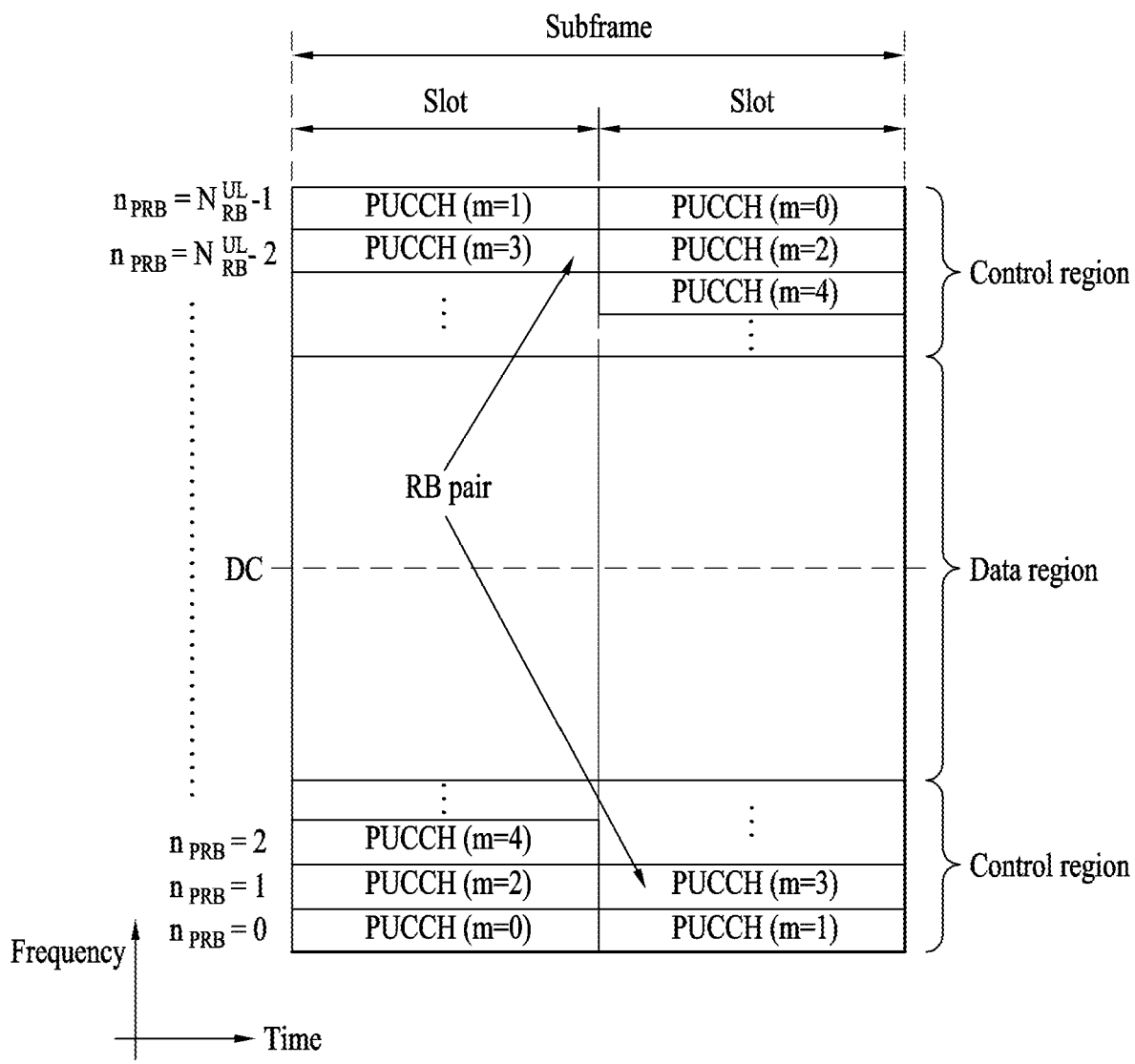
FIG. 4 illustrates an exemplary structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to carry UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs in each of UL and DL are aggregated to support a BW of 60 MHz. The CCs may be contiguous or non-contiguous in the frequency domain. Although a case that a BW of UL CC and a BW of DL CC are the same and are symmetrical is described, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

A configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, pre-reserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell.

For reference, a carrier indicator (CI) means a serving cell index ServCellIndex and CI=0 is applied to a Pcell. The serving cell index is a short identity used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present disclosure means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling).

In a legacy system based on the premise of communication with a single node, UE-RSs, CSI-RSs, and CRSs are transmitted at the same position ㄴ. Hence, a UE does not consider the possibility that a UE-RS port, a CSI-RS port, and a CRS port may differ in delay spread, Doppler spread, frequency shift, average received power, and reception timing. On the contrary, in a communication system using the coordinated multi-point (CoMP) communication technology which enables a plurality of nodes to simultaneously participate in communication with a UE, a PDCCH port, a PDSCH port, a UE-RS port, a CSI-RS port, and/or a CRS port may have different characteristics. That's why the concept of quasi co-located antenna ports has been introduced for a mode in which a plurality of nodes are likely to participate in communication (hereinafter, referred to as a CoMP mode).

The term "quasi co-located (QCL)" or "quasi co-location (QCL)" may be defined as follows in terms of antenna ports. If two antenna ports are quasi co-located, a UE may assume that large-scale properties of a signal received from one of the two antenna ports may be inferred from a signal received from the other antenna port. The large-scale properties include delay spread, Doppler spread, frequency shift, average received power, and/or reception timing.

In terms of channels, QCL may be defined as follows. If two antenna ports are quasi co-located, the UE may assume that large-scale properties of a channel on which a symbol on one of the two antenna ports is conveyed may be inferred from a channel over which a symbol on the other antenna port is conveyed. The large-scale properties include delay spread, Doppler spread, frequency shift, average received power, and/or reception timing.

In embodiments of the present disclosure, one of the above definitions may be applied to QCL. Or the definition of QCL may be modified to a similar other definition that QCL-assumed antenna ports may be assumed to be co-located. For example, QCL may be defined such that the UE assumes QCL antenna ports to be antenna ports of the same transmission point.

The UE may not assume the same large-scale properties for non-quasi co-located (NQC) antenna ports. In this case, the UE should typically perform independent processing for each configured NQC antenna, regarding timing acquisition and tracking, frequency offset estimation and composition, delay estimation, and Doppler estimation.

On the other hand, the UE may advantageously perform the following operations for QCL-assumed antenna ports.

Regarding Doppler spread, the UE may apply the results of estimating a power-delay-profile, a delay spread, a Doppler spectrum, and a Doppler spread for one port to a filter (e.g., a Wiener filter) used in channel estimation for another port.

Regarding frequency shift and reception timing, the UE may acquire time and frequency synchronization for one port, and then apply the same synchronization to demodulation for another port.

Regarding average received power, the UE may average reference signal received power (RSRP) measurements across two or more antenna ports.

For example, upon receipt of a specific DMRS-based DL DCI format (e.g., DCI format 2C) on a PDCCH/EPDCCH, the UE performs channel estimation on a corresponding PDSCH, using a configured DMRS sequence, and then performs data demodulation. If the UE may assume QCL between a DMRS port configuration indicated by this DL scheduling grant and a specific RS port (e.g., a port for a specific CSI-RS, a specific CRS, or a DL serving cell CRS of the UE), the UE may apply large-scale property estimate(s) calculated for the specific RS port to channel estimation through a corresponding DMRS port, thereby increasing DMRS-based receiver processing performance.

Figure 5:
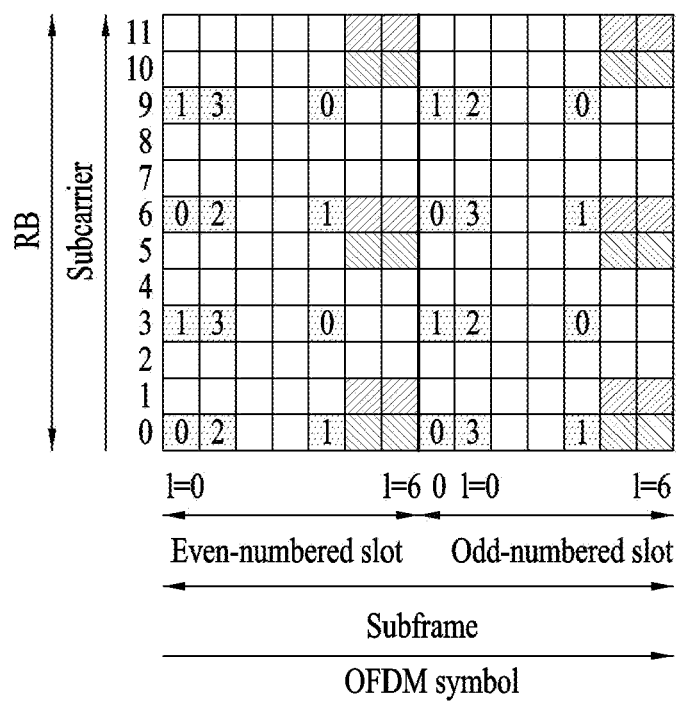
FIG. 5 illustrates a configuration of cell specific reference signals (CRSs) and user-specific reference signals (UE-RSs).
Figure 6:
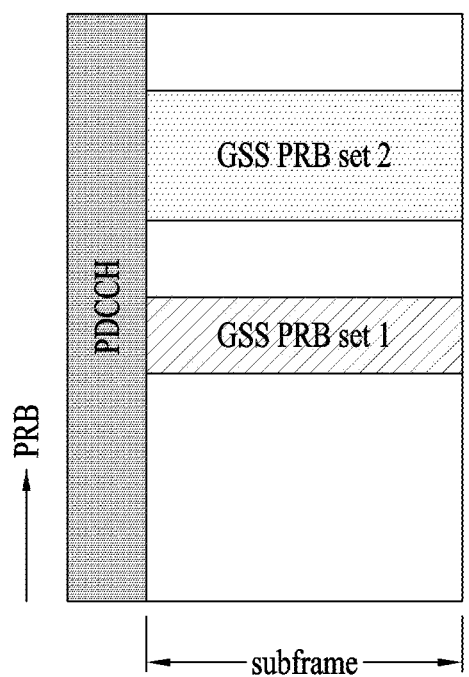
FIGS. 6 to 9 illustrate DCI transmission resources for SC-PTM according to the present invention.

FIG. 5 illustrates a configuration of CRSs and UE-RSs. In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

Referring to FIG. 5, a CRS is transmitted through antenna port p=0, p=0, 1, or p=0, 1, 2, 3 according to the number of antenna ports of a transmission node. The CRS is fixed to a predetermined pattern in a subframe regardless of a control region and a data region. A control channel is allocated to a resource on which the CRS is not allocated in the control region and a data channel is allocated to a resource on which the CRS is not allocated in the data region.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-RS and a CSI-RS are further defined in addition to a CRS. The UE-RS is used for demodulation and the CSI-RS is used to derive CSI. The UE-RS is one type of a DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Referring to FIG. 5, UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

In the 3GPP LTE-A system, the UE-RSs are defined in a PRB pair. Referring to FIG. 5, in a PRB having frequency-domain index $n_{PRB}$ assigned for PDSCH transmission with respect to p=7, p=8, or p=7, 8, . . . , υ+6, a part of UE-RS sequence r(m) is mapped to complex-valued modulation symbols $a_{k,l}^{(p)}$ in a subframe according to the following equation.

$$a_{k,l}^{(p)} = w_p(l') \cdot r(3 \cdot l' \cdot N_{RB}^{max,DL} + 3 \cdot n_{PRB} + m') \quad \text{Equation 1}$$

where $w_p(i)$, l', m' are given as follows.

$$w_p(i) = \begin{cases} \bar{w}_p(i) & (m' + n_{PRB}) \bmod 2 = 0 \\ \bar{w}_p(3-i) & (m' + n_{PRB}) \bmod 2 = 1 \end{cases} \quad \text{Equation 2}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 2)} \\ l' \bmod 2 + 2 + 3\lfloor l'/2 \rfloor & \text{if in a special subframe with configuration 1, 2, 6, or 7 (see Table 2)} \\ l' \bmod 2 + 2 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in special subframe with configuration 1, 2, 6, or 7 (see Table 2)} \\ 2, 3 & \text{if } n_s \bmod 2 = 1 \text{ and not in special subframe with configuration 1, 2, 6, or 7 (see Table 2)} \end{cases}$$

$$m' = 0, 1, 2$$

Herein, $n_s$ is a slot number in a radio frame, which is one of the integers of 0 to 19. The sequence $\bar{w}_p(i)$ for normal CP is given according to the following equation.

TABLE 10

| Antenna port p | $[\bar{w}_p(0) \; \bar{w}_p(1) \; \bar{w}_p(2) \; \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7, 8, . . . , υ+6}, the UE-RS sequence r(m) is defined as follows.

$$r(m) = \frac{1}{\sqrt{2}}(1 - 2 \cdot c(2m)) + j\frac{1}{\sqrt{2}}(1 - 2 \cdot c(2m+1)), \; m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases} \quad \text{Equation 3}$$

c(i) is a pseudo-random sequence defined by a length-31 Gold sequence. The output sequence c(n) of length $M_{PN}$, where n=0, 1, . . . , $M_{PN}$−1, is defined by the following equation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{Equation 4}$$

where $N_C$=1600 and the first m-sequence is initialized with $x_1(0)$=1, $x_1(n)$=0, n=1, 2, . . . , 30. The initialization of the second m-sequence is denoted by $c_{init} = \sum_{i=0}^{30} x_2(i) \cdot 2^i$ with the value depending on the application of the sequence.

In Equation 3, the pseudo-random sequence generator for generating c(i) is initialized with $c_{init}$ at the start of each subframe according to the following equation.

$$c_{init} = (\lfloor n_s/2 \rfloor + 1) \cdot (2n_{ID}^{(nSCID)} + 1) \cdot 2^{16} + n_{SCID} \quad \text{Equation 5}$$

In Equation 5, the quantities $n_{ID}^{(i)}$, i=0, 1, which is corresponding to $n_{ID}^{(nSCID)}$, is given by a physical layer cell identifier $N_{ID}^{cell}$ if no value for $n_{ID}^{DMRS,i}$ is provided by higher layers or if DCI format 1A, 2B or 2C is used for DCI format associated with the PDSCH transmission, and given by $n_{ID}^{DMRS,i}$ otherwise.

In Equation 5, the value of $n_{SCID}$ is zero unless specified otherwise. For a PDSCH transmission on antenna ports 7 or 8, $n_{SCID}$ is given by the DCI format 2B or 2D. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107, 108, 109, 110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE monitors a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level $L \in \{1, 2, 4, 8, 16, 32\}$ is defined by a set of EPDCCH candidates.

For an EPDCCH-PRB-set p configured for distributed transmission, the ECCEs corresponding to EPDCCH candidate m of the search space $ES^{(L)}_k$ are given by the following table.

$$L\left\{\left(Y_{p,k} + \left\lfloor \frac{m \cdot N_{ECCE,p,k}}{L \cdot M^{(L)}_p} \right\rfloor + b\right) \mod \lfloor N_{ECCE,p,k}/L \rfloor\right\} + i$$

where $i=0, \ldots, L-1$. $b=n_{CI}$ if the UE is configured with a carrier indicator field for the serving cell on which EPDCCH is monitored, otherwise $b=0$. $n_{CI}$ is the carrier indicator field (CIF) value, which is the same as a serving cell index (ServCellIndex). $m=0, 1, \ldots, M^{(L)}_p-1$, $M^{(L)}_p$ is the number of EPDCCH candidates to monitor at aggregation level L in EPDCCH-PRB-set p. The variable $Y_{p,k}$ is defined by '$Y_{p,k}=(A_p \cdot Y_{p,k-1}) \mod D$', where $Y_{p,k-1}=n_{RNTI}\neq 0$, $A_0=39827$, $A_0=39829$, $D=65537$ and $k=\text{floor}(n_s/2)$. $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by Table 11, the number of EREGs per ECCE is given by Table 12. Table 11 shows an example of supported EPDCCH formats, and Table 12 shows an example of the number of EREGs per ECCE, $N^{EREG}_{ECCE}$. Both localized and distributed transmission is supported.

TABLE 11

Number of ECCEs for one EPDCCH, $N^{ECCE}_{EPDCCH}$

| | Case A | | Case B | |
|---|---|---|---|---|
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 12

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

An EPDCCH may use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}-1$. ECCE number n is corresponding to the following EREG(s):

EREGs numbered (n mod $N^{ECCE}_{RB}$)+$jN^{ECCE}_{RB}$ in PRB index floor(n/$N^{ECCE}_{RB}$) for localized mapping, and EREGs numbered floor {(n/$N^{Sm}_{RB}$)+$jN^{ECCE}_{RB}$} in PRB indices (n+j max(1,$N^{Sp}_{RB}/N^{EREG}_{ECCE}$))mod $N^{Sp}_{RB}$ for distributed mapping.

where $j=0, 1, \ldots, N^{EREG}_{ECCE}-1$, $N^{EREG}_{ECCE}$ is the number of EREGs per ECCE, and $N^{ECCE}_{RB}=16/N^{EREG}_{ECCE}$ is the number of ECCEs per RB pair. The PRB pairs constituting EPDCCH set $S_p$ are assumed to be numbered in ascending order from 0 to $N^{Sp}_{RB}-1$.

Case A in Table 11 applies when:
DCI formats 2, 2A, 2B, 2C or 2D is used and $N^{DL}_{RB} \geq 25$, or
any DCI format when $n_{EPDCCH} < 104$ and normal cyclic prefix is used in normal subframes or special subframes with configuration 3, 4, 8.

Otherwise case 2 is used. The quantity $n_{EPDCCH}$ for a particular UE is defined as the number of downlink resource elements (k,l) in a PRB pair configured for possible EPDCCH transmission of EPDCCH set $S_0$ and and fulfilling all of the following criteria, they are part of any one of the 16 EREGs in the physical resource-block pair,
they are assumed by the UE not to be used for CRSs or CSI-RSs,
the index l in a subframe fulfils $l \geq l_{EPDCCHStart}$.

where $l_{EPDCCHStart}$ is given based on higher layer signaling 'epdcch-StartSymbol-r11', higher layer signaling 'pdsch-Start-r11', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by Table 13 with $n'=n_{ECCE,low}$ mod $N^{ECCE}_{RB}+n_{RNTI}$ mod min($N^{ECCE}_{EPDCCH},N^{ECCE}_{RB}$), where $n_{ECCE,low}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for this EPDCCH.

TABLE 13

| | Normal cyclic prefix | | |
|---|---|---|---|
| n' | Normal subframes, Special subframes, configurations 3, 4, 8 | Special subframes, configurations 1, 2, 6, 7, 9 | Extended cyclic prefix Any subframe |
| 0 | 107 | 107 | 107 |
| 1 | 108 | 109 | 108 |
| 2 | 109 | — | — |
| 3 | 110 | — | — |

For distributed transmission, each resource element in an EREG is associated with one out of two antenna ports in an alternating manner where p∈{107, 109} for normal cyclic prefix and p∈{107, 108} for extended cyclic prefix.

To position LTE as technology for critical communications such as Public Safety, Group Communication System Enablers for LTE, group communication using an MBSFN may be considered. Existing MBSFNs have evolved to efficiently transmit multicast services over somewhat static and wide pre-planned areas spanning multiple (geographical) cells. MBSFN subframe configuration is somewhat static and thus cannot be dynamically adjusted according to the number of UEs and distribution of loads. In addition, although existing MBSFN transmission occupies the entire system bandwidth, multicast for critical communication is not allowed to be multiplexed with unicast within the same subframe configured as an MBSFN subframe, even though all radio resources in the frequency domain are not utilized. Therefore, resources for MBMS can be unnecessarily wasted upon preparing services for critical communication. Thus, there may be applications in which it is advantageous to support multicast services for a single cell. Unlike the existing MBMS service provided by an MBMS point to multipoint radio bearer, an MBMS service by single cell point-to-multipoint transmission is referred to as an SC-PTM service or SC-PTM transmission. Unlike the existing MBMS service, the SC-PTM service is provided by a single cell MRB (SC-MRB).

SC-PTM (single-cell point-to-multipoint) transmission can consume fewer resources than MBSFN transmission if a service needs to be provided in a limited geographical area (i.e. when users receiving a service are all in 1, 2 or 3 cells, or when the MBSFN area is pre-defined and contains a number of cells with no user receiving the service). SC-PTM transmission with UL feedback, spectral efficiency of which depends on the number of receiving UEs, tends to provide better spectral efficiency than MBSFN transmission for small numbers of receiving UEs. With SC-PTM, the broadcast area can be dynamically adjusted cell by cell to fit the dynamically defined geographic area (e.g. incident's physical location) for a group call, using the cell list provided by the core network, without the need to pre-establish the MBMS bearers over a pre-defined geographic area like for MBSFN.

Furthermore, SC-PTM transmission can provide more flexible resource allocation due to dynamic scheduling via PDCCH and it can be multiplexed with unicast transmission in frequency domain, which can improve the spectral efficiency for certain services (e.g. bursty traffic).

SC-PTM transmission may be used as a complementary tool for providing critical communications. SC-PTM may be used by cellular operators who have unsynchronized networks due to cost or for other reasons. In addition to critical communications, SC-PTM transmission could also be used as a multicast technology for other commercial use cases, e.g. over-the-top video or popular app download, mobile advertising, traffic information for cars, etc.

To support SC-PTM transmission, SC-PTM transfers the MBMS session data over a single cell using a PDSCH, and the PDSCH carrying the MBMS session data is scheduled using a common RNTI (Group-RNTI or G-RNTI) on PDCCH/EPDCCH, unlike a PMCH. A UE performing SC-PTM reception might be either in RRC_IDLE or in RRC_CONNECTED.

Hereinafter, a PDCCH/EPDCCH search space for transmission of downlink control information (DCI) for scheduling of SC-PTM will be proposed.

Hereinafter, monitoring DCI scrambled with a G-RNTI is expressed as monitoring the G-RNTI and receiving a PDSCH scheduled by the DCI scrambled with the G-RNTI is expressed as receiving a PDSCH scheduled by the G-RNTI.

For reference, the G-RNTI is provided in addition to or independent of an existing temporary mobile group identity (TMGI). The TMGI identifies transmission or possible retransmission of a particular MBMS session along with an optional MBMS service identifier. The TMGI is defined by a PLMN-index which is an index of an entry in a public land mobile network (PLMN) in System Information Block Type1 (SIB1) and a service identifier for uniquely identifying the identifier of an MBMS service in the PLMN. The same G-RNTI may be configured for one or more MBMS sessions. Alternatively, a plurality of G-RNTIs may be configured for one MBMS session.

A PDSCH carrying SC-PTM and an (E)PDCCH scheduling SC-TPM may have the following features.

SC-PTM is used to transfer MBMS session data over a single cell using a PDSCH.

SC-PTM is scheduled using a common RNTI (that is, G-RNTI) on a PDCCH or an EPDCCH (hereinafter, PDCCH/EPDCCH).

SC-PMT transmission supports transmission schemes associated with Transmission Modes 1, 2 and 3.

There are multiple (e.g., 36 to 150) G-RNTIs.

One UE belongs to multiple G-RNTIs. When information on a G-RNTI for each service is provided for multiple G-RNTIs, a UE determines service(s), in which the UE is interested, and monitors the G-RNTI(s) of the service(s). That is, one UE may monitor multiple G-RNTIs and receive PDSCH(s) scheduled by the G-RNTI(s). Therefore, one UE may receive a plurality of services.

For a plurality of G-RNTIs, DCI scrambled with the corresponding G-RNTIs may be transmitted in the same subframe. That is, a plurality of G-RNTIs may be monitored in the same subframe.

Transmission modes (TMs) of PDSCHs scheduled by different G-RNTIs may be different from each other. Accordingly, DCI scrambled with different G-RNTIs may have different DCI formats.

In the present invention, an (E)PDCCH search space for transmission of DCI scheduling SC-PTM will be proposed in consideration of the features of SC-PTM transmission. FIGS. 6 to 9 illustrate DCI transmission resources for SC-PTM according to the present invention.

<A. Group Search Space (GSS)>

—Cell-Specific Search Space

Considering that UEs in an RC_IDLE state also receive SC-PTM, an eNB cannot completely know G-RNTIs monitored by each UE. Accordingly, although a particular UE monitors DCI only for G-RNTIs thereof, it is not preferable for an eNB to transmit only the DCI of G-RNTIs of a particular set for the specific UE. Accordingly, it is necessary to configure a search space for transmission of DCI scheduling SC-PTM, such that all UEs monitor all G-RNTIs. To this end, a search space for transmission of DCI scheduling SC-PTM may be cell-specifically configured.

—EPDCCH Based Search Space

A total number of G-RNTIs which may be transmitted in a search space for transmission of DCI scheduling SC-PTM in one cell is as large as 36 to 150, for example. Referring to Table 9, in an existing PDCCH common search space, since a total number of decoding candidates, that is, the number of PDCCH candidates, is small, DCI for a large number of G-RNTIs may not be simultaneously transmitted. Of course, DCI for a plurality of G-RNTIs may be transmitted using a TDM scheme. However, when G-RNTIs are subjected to TDM using different subframe resources, since the number of PDCCHs transmitted in one subframe is small, all PDCCHs for a large number of G-RNTIs may not be transmitted in the same subframe. Accordingly, multiplexing a large number of G-RNTIs using a TDM scheme may reduce transmission flexibility. Accordingly, a new cell-specific search space, which is not for legacy PDCCHs, is preferably defined as a search space for transmission of DCI scheduling SC-PTM. A search space (hereinafter, a group search space (GSS)) for transmission of DCI scheduling SC-PTM is proposed based on the form of EPDCCHs which are not transmitted in a legacy PDCCH region in order to minimize influence on transmission of legacy PDCCHs.

—PRB Location

An existing EPDCCH search space is cell-specifically configured. In the case of an EPCCH UE-specific search space (USS), at most two PRB-sets may be configured with respect to a UE, for the EPDCCH USS. In the present invention, the number of PRB-sets for a GSS will be proposed as follows.

\* One PRB-Set

A GSS is highly likely to be a cell-specific search space. In the case of the cell-specific search space, it is unnecessary to have a plurality of PRB-sets having different transmission types and PRB sizes, as compared to a UE-specific search space. Accordingly, the GSS may always have one PRB set.

\* 2 PRB-Sets

Figure 7:
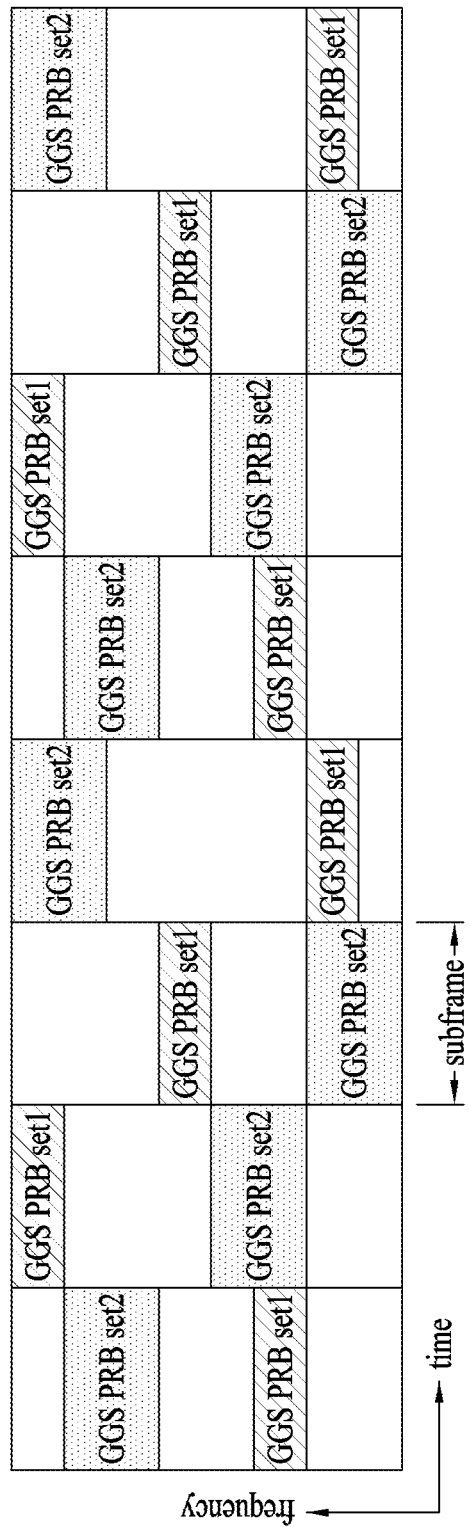

In order to introduce the GSS while minimizing impact of the existing PDCCH and the existing EPDCCH, even in the GSS, at most two PRB-sets may be supported as in a current EPDCCH USS. For example, as shown in FIG. 7, two PRB-sets may be configured for the GSS. In this case, the number of times of blind detection used in the EPDCCH and the number of decoding candidates may be used for GSS monitoring without change.

\* More than 2 PRB-Sets

More than 2 PRB-sets may be supported for the GSS. G-RNTIs may be divided into multiple sets and a different GSS PRB-set may be configured for each G-RNTI set. In this case, the number of GSS PRB-sets to be monitored by the UE may be reduced. Alternatively, based on the fact that configured PRB regions differ between PRB-sets, an eNB is enabled to transmit DCI through good PRB-sets, thereby increasing DCI transmission performance and obtaining frequency diversity effects.

In order to increase frequency diversity effects in reception of DCI on the GSS and to realize interference randomization, for example, as shown in FIG. 7, PRB resources configuring the GSS PRB-set may be changed every subframe or a plurality of subframes. Such frequency hopping may be 1) commonly applied to all GSS PRB-set(s) or 2) selectively applied to some GSS PRB-set(s).

—Subframe Set

In the case of the existing EPDCCH USS, a subframe which the EPDCCH USS will be monitored may be UE-specifically configured. The UE monitors the EPDCCH USS in the configured subframe region and monitors the PDCCH USS in the remaining subframe region.

The present invention proposes the subframe region in which the UE monitors the GSS.

Considering the frequency, at which the SC-PTM is transmitted, the subframe region in which the UE monitors the GSS may be determined or set to some subframe regions such that the UE does not always monitor the GSS unnecessarily. Such a GSS monitoring subframe region may be determined or configured independently for each GSS PRB-set.

Figure 8:
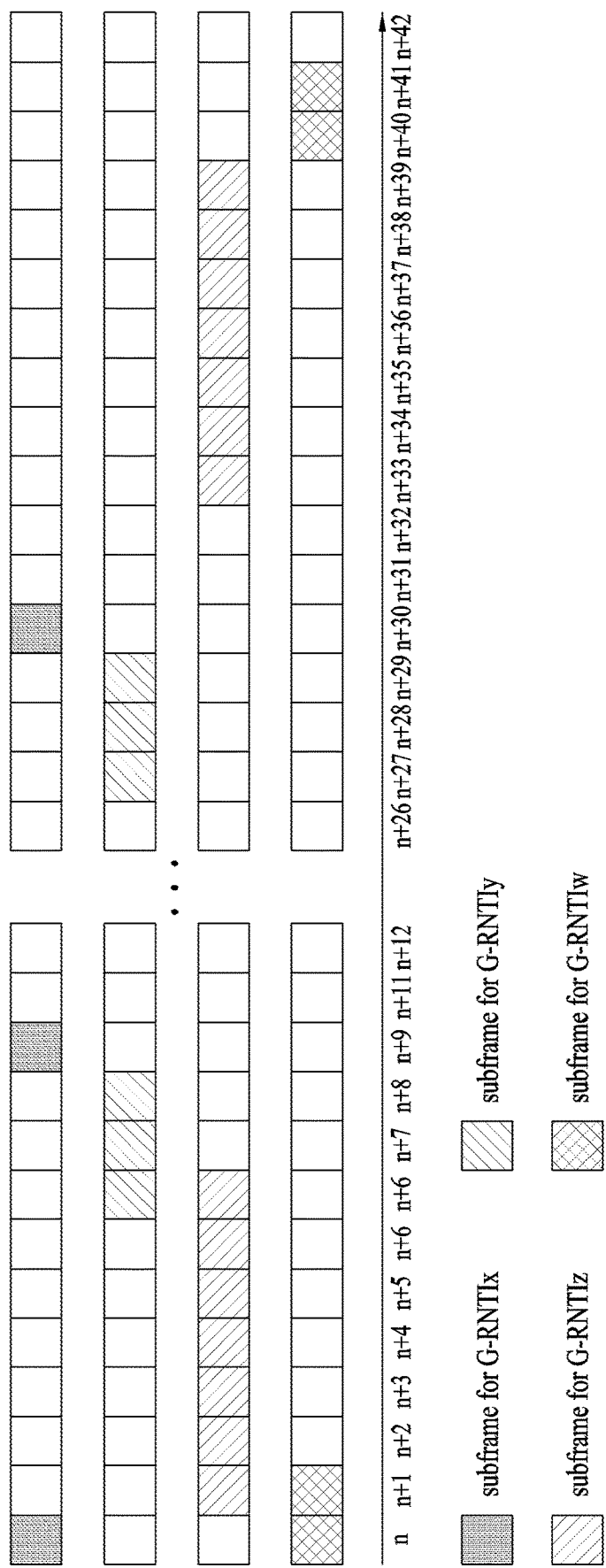

Alternatively, the UE may monitor only one or some PRB-sets in one subframe among the subframe regions in which the GSS is monitored, that is, the subframes in which the GSS is configured. For example, if P PRB-sets are present and the UE monitors only one PRB-set in one subframe, a PRB-set P monitored in a subframe k may be equal to k mode P. Even within the same PRB-set, the G-RNTI, by which the SC-PTM is scheduled, may differ according to the subframe. A plurality of G-RNTIs is divided into G sets and a subframe region, in which DCI scheduling an SC-PTM for G-RNTIs belonging to each set may be transmitted, may be limited. For example, DCI for G G-RNTI sets may be transmitted in G different subframe sets. Accordingly, for a plurality of G-RNTIs, a subframe set in which DCI will be transmitted with a corresponding G-RNTI may be determined or configured per G-RNTI. The UE may decode the G-RNTI only in the subframes of the subframe set associated with the G-RNTI of the SC-PTM in which the UE is interested. The UE need not attempt to receive the DCI scheduling the SC-PTM in the subframes associated with the G-RNTI(s) of the SC-PTM in which the UE is not interested. For example, as shown in FIG. 8, the subframe(s) that may have DCI due to a particular G-RNTI x may be set to a subset of (full downlink) subframes. The UE which is receiving or will receive the SC-PTM associated with the particular G-RNTI x may monitor the GSS with the G-RNTI only in the subframe(s) configured for the G-RNTI x, not in every subframe. In the case of the subframe associated with a plurality of (e.g., X) G-RNTIs, the UE may monitor at most X G-RNTIs in the corresponding subframe. For example, referring to FIG. 8, since subframe n+1 belongs to a subframe set for G-RNTI z and also belongs to a subframe set for G-RNTI w, the UE which monitors G-RNTI z and G-RNTI w may descramble the DCI using G-RNTI z in subframe n+1 and descramble other DCI using G-RNTI w.

In subframe k, the value of G-RNTI mod G may be defined or configured such that only DCI for the same G-RNTIs as the value of k mod G is transmitted. The UE may monitor only DCI(s) for the corresponding G-RNTI(s) in subframe k satisfying k mod G=G-RNTI mod G.

Except for the MBSFN subframe, an arbitrary downlink subframe of a corresponding cell may be used for SC-PTM. However, according to one embodiment of the present invention, the eNB may be configured to transmit SC-PTM using only G-RNTI(s) corresponding to the corresponding downlink subframe according to the downlink subframe. Therefore, the UE does not monitor all downlink subframe except for the MBSFN subframe but monitors only downlink subframes configured for G-RNTI(s) associated therewith.

The existing MBSFN subframe is configured regardless of the TMGI. That is, in the case of the existing MBSFN, a subframe in which the UE receives a PMCH is not changed according to the TMGI. In addition, since the PMCH is not scheduled by the PDCCH, the UE does not receive a PDCCH scheduling the PMCH in order to receive the PMCH. In contrast, the SC-PTM is received through the PDSCH, and the UE monitors the PDCCH in order to receive the SC-PTM in which the UE is interested. According to one embodiment of the present invention, the subframe to be monitored may be changed according to the G-RNTI. In the case of paging, since one P-RNTI is used, a subframe in which the P-RNTI is monitored is not changed according to the P-RNTI. Meanwhile, a media access control (MAC) entity may be configured by radio resource control (RRC) to have discontinuous reception (DRX) functionality for controlling PDCCH monitoring activity of the corresponding UE for UE-specific RNTI(s) (e.g., C-RNTI, TPC-PUCCH-RNTI, TPC-PUSCH-RNTI, SPS C-RNTI, etc. of the MAC object). Since one MAC object is present in one UE unless the UE is simultaneously connected to a plurality of eNBs, a plurality of C-RNTIs, a plurality of TPC-PUCCH-RNTIs, a plurality of TPC-PUSCH-RNTIs or a plurality of SPS C-RNTIs is not configured for the UE. In addition, a subframe set to be monitored by the UE is not separately configured for each UE-specific RNTI. For example, the DRX of the MAC object is UE-specifically configured regardless of the type of the RNTI. Accordingly, the UE monitors the C-RNTI, TPC-PUCCH-RNTI and TPC-PUSCH-RNTI in every subframe within an active time. In contrast, when a plurality of G-RNTIs may be used in the corresponding cell, since the eNB does not know which G-RNTI will be monitored, according to one embodiment of the present invention, a subframe set available for each G-RNTI may be configured for the plurality of G-RNTIs. Therefore, each UE, which has received information on the above configuration, monitors only the GSS in the subframe(s) associated with the G-RNTI(s), in which the UE is interested, among all subframes that may have the SC-PTM in the corresponding cell, that is, all subframes in which the GSS is configured.

<B. Blind Detection of Group Search Space>

The number of times of BD simultaneously performed by the UE or BD capability of the UE is determined. The present invention proposes schemes for receiving DCI scheduling SC-PTM from a GSS without increasing the BD capability of the UE.

—Blind Detection of CSS, USS and GSS

When the UE monitors the PDCCH CSS and the PDCCH USS or the EPDCCH USS in one subframe as in the conventional case, since most or all of the BD capability of the UE is used in the corresponding subframe, it is impossible to additionally monitor the GSS in the same subframe. Accordingly, the UE may monitor the CSS, the USS and the GSS using the following methods.

* Subframe Division

Figure 9:
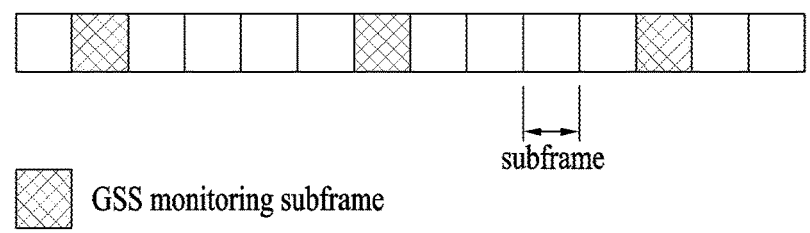
Figure 10:
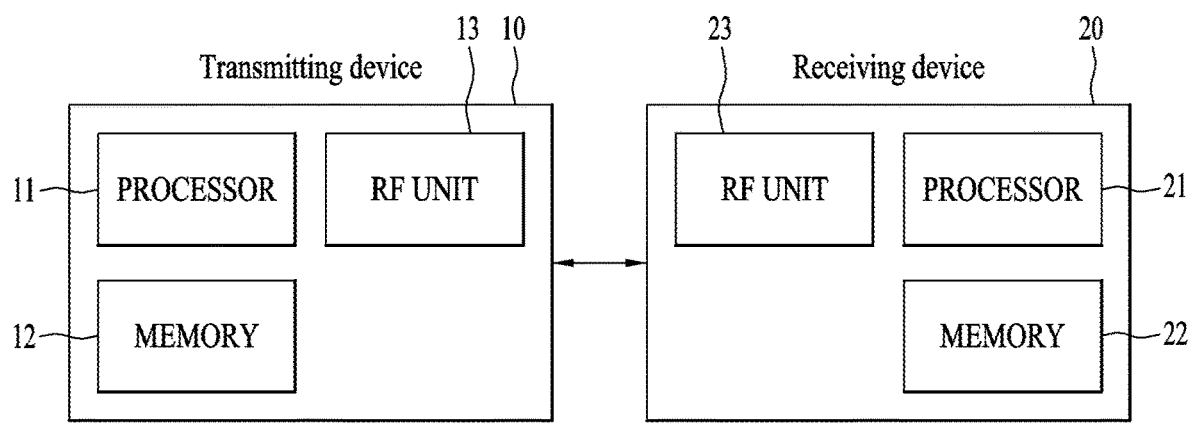
FIG. 10 is a block diagram illustrating components of a transmitting device 10 and a receiving device 20 for implementing the present disclosure.

The subframe region in which the UE monitors the GSS may be limited to a subset of subframe as shown in FIG. 9. In this case, in such a GSS monitoring subframe, the USS and/or the CSS may not be monitored. For example, the UE may monitor the CSS in all subframes in which the CSS has been monitored, but may not monitor the USS in the subframe in which the GSS has been monitored.

When the GSS monitoring subframe and the EPDCCH USS monitoring subframe overlap, the UE may preferentially monitor only the GSS in the corresponding subframe but may not monitor the EPDCCH USS. Alternatively, the UE may put USS monitoring ahead of GSS monitoring and may preferentially monitor only the EPDCCH USS in the corresponding subframe but may not monitor the GSS.

* PRB-Set Division

In order for the UE to monitor the EPDCCH USS and the GSS together within given BD capability to perform blind detection, the number of EPDCCH PRB-sets is limited to at most one and the remaining BD capability may be used for GSS monitoring. For example, at most one EPDCCH PRB-set may be configured and at most one GSS PRB-set may be configured.

Alternatively, if two (or more) EPDCCH PRB-sets are configured, the UE may monitor only one EPDCCH PRB-set in the GSS monitoring subframe. For example, if two EPDCCH PRB-sets are configured and one GSS PRB-set is configured, in the GSS monitoring subframe or the GSS and EPDCCH USS monitoring subframe, only one EPDCCH PRB-set may be monitored and the GSS may be monitored. At this time, one EPDCCH PRB-set monitored by the UE 1)

may always be EPDCCH-PRB-set 1, 2) may always be EPDCCH-PRB-set 2, 3) may be configured by the eNB through RRC or 4) may be determined according to a subframe index in which the UE performs monitoring.

In this case, the GSS monitoring subframe may be present in the EPDCCH monitoring subframe.

* BD Division

In order for the UE to monitor the USS and the GSS together within given BD capability to perform blind detection, the number of decoding candidates monitored by the UE in the PDCCH and/or the EPDCCH USS may be reduced and GSS monitoring may be performed using the remaining BD capability. To this end, the number of decoding candidates of the PDCCH USS and/or the EPDCCH USS which may be monitored by the UE capable of receiving the SC-PTM may be reduced as compared to the conventional case.

—GSS Monitoring for Various DCI Formats and/or Transmission Modes

The PDSCH carrying the SC-PTM may be transmitted using transmission schemes differing according to the G-RNTI scheduling the SC-PTM. For example, SC-PTM transmission may be performed using the transmission scheme associated with transmission mode 1, 2 or 3.

The DCI format of the DCI scheduling the SC-PTM is changed according to the transmission scheme or transmission mode of the SC-PTM. Accordingly, the DCI format of the DCI, for which the UE should perform blind detection, is changed according to the transmission scheme or transmission mode of the SC-PTM.

When the UE knows the transmission scheme or transmission mode of the SC-PTM for each G-RNTI, since the DCI format of the DCI for each G-RNTI is known, the UE may perform reception of the DCI using the corresponding DCI format. To this end, for example, the transmission scheme or transmission mode for each G-RNTI may be configured by the eNB. Such information may be configured through an RRC signal.

Meanwhile, the UE may not know the transmission scheme or transmission mode of the SC-PTM for each G-RNTI. In this case, referring to Table 5, since DCI formats used in transmission mode 1 and transmission mode 2 are equal to DCI format 1 or DCI format 1A, the UE may not know in which of transmission mode 1 or transmission mode 2 the SC-PTM scheduled by the corresponding DCI is transmitted. In this case, the UE may assume that the following transmission mode is used for SC-PTM transmission.

Option 1: The UE may assume that transmission mode 1 is always used for SC-PTM transmission. In this case, even when the number of transmit antenna ports of the cell is equal to or greater than 2, it may be assumed that the SC-PTM is transmitted using transmission mode 1.

Option 2: If the number of transmit antenna ports of the cell is equal to or greater than 2, the UE may assume that transmission mode 2 is always used for SC-PTM transmission. In this case, if the number of transmit antenna ports is 1, it may be assumed that transmission mode 1 is used for SC-PTM transmission.

In a state in which the UE does not know the transmission scheme or transmission mode of the SC-PTM for each G-RNTI, the UE may perform blind detection with respect to all DCI formats (e.g., DCI formats 1, 1A and 2A) of the DCI scheduling the SC-PTM for each decoding candidate. However, this may increase complexity of the UE. In order to reduce complexity of the UE, the number of types of the DCI format in which the UE attempts detection for one decoding candidate needs to be reduced. To this end, the following methods may be used.

Method 1: The DCI format transmitted per GSS PRB-set (or the transmission mode of the SC-PTM scheduled by the DCI) may be limited. For example, if there are two GSS PRB-sets, only DCI modes 1A and 1 may be transmitted in one GSS PRB-set and only DCI formats 1A and 2A may be transmitted in the other GSS PRB-set. Alternatively, for example, if there are three GSS PRB-sets, only SC-PTM using transmission mode 1 may be scheduled in a first GSS PRB-set, only SC-PTM using transmission mode 2 may be scheduled in a second GSS PRB-set, and only SC-PTM using transmission mode 3 may be scheduled in a third GSS PRB-set.

Method 2: The DCI format transmitted per decoding candidate in the GSS (or the transmission mode of the SC-PTM scheduled by the DCI) may be limited. For example, the transmittable DCI format(s) may be determined according to the index of the decoding candidate.

<C. Configurations for Group Search Space>

In order for the UE to monitor the GSS, the following parameters 1) may be predefined, 2) may be configured as a system information block (SIB) or 3) may be configured as RRC. In the case of some parameters, configuration methods may differ among parameters.

PRB-set index locations/number of PRBs per PRB-set

GSS monitoring subframe set. This may be configured per PRB-set or is commonly applicable to all PRB-sets.

transmission type (localized transmission or distributed transmission). This may be configured per PRB-set or is commonly applicable to all PRB-sets.

G-RNTI set/G-RNTI set index which may be monitored in the corresponding PRB-set. This may be configured per PRB-set.

DCI format(s) transmitted in the corresponding PRB-set or transmission mode(s) in which the SC-PTM scheduled in the corresponding PRB-set is transmitted.

FIG. 15 is a block diagram illustrating elements of a transmitting device 10 and a receiving device 20 for implementing the present disclosure.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present disclosure.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present disclosure. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present disclosure is implemented using firmware or software, the firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present disclosure, a UE operates as the transmitting device 10 in UL and as the receiving device 20 in DL. In the embodiments of the present disclosure, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may configure time-frequency resources for SC-PTM. The eNB processor may control the eNB RF unit to transmit SC-PTM configuration information for SC-PTM according to any one of the above-described proposals of the present invention. The SC-PTM configuration information may include a group search space (GSS) configuration for SC-PTM. The eNB processor may configure a GSS per G-RNTI. For example, the eNB processor may configure a subframe set that may have DCI scrambled with the corresponding G-RNTI for each G-RNTI. As another example, the eNB processor may configure a PRB-set that may have DCI scrambled with the corresponding G-RNTI for each G-RNTI. When a plurality of G-RNTIs may be used in the corresponding cell, the eNB processor may configure a subframe set and/or a PRB-set for each of the plurality of G-RNTIs, thereby configuring a GSS per G-RNTI. The eNB processor may control the eNB RF unit based on configuration parameters for the GSS. The UE processor may control the eNB RF unit to transmit DCI scrambled with one of G-RNTI(s) available in the corresponding subframe through a PDCCH/EPDCCH using any one of decoding candidates in a GSS monitoring subframe configured according to the SC-PTM configuration information (e.g., GS configuration parameters). The eNB processor may control the eNB RF unit to transmit a PDSCH carrying MBMS session data for SC-PTM according to the DCI. If a plurality of G-RNTIs is available in the corresponding subframe, the eNB processor may control the eNB RF unit to transmit a plurality of PDCCHs/EPDCCHs in the corresponding subframe using the plurality of G-RNTIs.

SC-PTM configuration information for SC-PTM may be received according to any one of the above-described proposals of the present invention. The SC-PTM configuration information may include a GSS configuration for SC-PTM. The GSS may be configured per G-RNTI. For example, a subframe set that may have DCI scrambled with the corresponding G-RNTI may be configured for each G-RNTI. As another example, a PRB-set that may have DCI scrambled with the corresponding G-RNTI may be present may be configured for each G-RNTI. When a plurality of G-RNTIs is available in the corresponding cell, a subframe set and/or a PRB-set for each of the plurality of G-RNTIs may be configured, thereby configuring a GSS per G-RNTI. The UE processor may control the UE RF unit based on configuration parameters for the GSS. The UE processor may attempt to decode decoding candidates in a GSS monitoring subframe configured according to the SC-PTM configuration information (e.g., GSS configuration parameters) to receive DCI through any one of the decoding candidates and descramble the DCI using one of the G-RNTI(s) available in the corresponding subframe. The UE processor may control the UE RF unit to receive a PDSCH carrying MBMS session data for SC-PTM according to the DCI. If a plurality of G-RNTIs is available in the corresponding subframe and a plurality of G-RNTIs is associated with SC-PTM(s) which are being received or will be received by the UE, the UE processor may control the UE RF unit to receive DCI in the corresponding subframe using each of the plurality of G-RNTIs.

As described above, the detailed description of the preferred embodiments of the present disclosure has been given to enable those skilled in the art to implement and practice the invention. Although the invention has been described with reference to exemplary embodiments, those skilled in the art will appreciate that various modifications and variations can be made in the present disclosure without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present disclosure are applicable to a BS, a UE, or other devices in a wireless communication system.

The invention claimed is:

1. A method for receiving single cell point to multipoint (SC-PTM) data by a user equipment (UE), the method comprising:
receiving SC-PTM configuration information comprising (i) a plurality of group identifiers, (ii) information on physical resource block (PRB) sets and (iii) subframe set information of each of the plurality of group identifiers,
wherein the PRB sets are related to the plurality of group identifiers, respectively, and
wherein the PRB sets are differently located in a frequency domain, respectively;
receiving, on a first PRB set among the PRB sets, a first downlink control channel related to a first group identifier among the plurality of group identifiers based on the SC-PTM configuration information; and
receiving, on a first downlink data channel, data of a multimedia broadcast/multicast service (MBMS) session related to the first group identifier based on downlink control information carried by the first downlink control channel,
wherein the first downlink control channel is received only in a first subframe set related to the first group identifier among a plurality of subframe sets, and
wherein the plurality of group identifiers is divided into G group identifier groups and a subframe set for each of the G group identifier groups is composed of subframes satisfying "G-RNTI" mod "G"="k" mod "G", where "G-RNTI" denotes a group identifier and "k" denotes a subframe number.

2. The method of claim 1, wherein the first PRB set related to the first group identifier is frequency hopped within the first subframe set related to the first group identifier.

3. The method of claim 1, wherein each subframe in the first subframe set related to the first group identifier is divided into a control region and a data region in a time domain, and
wherein the first downlink control channel is received in the data region.

4. A method for transmitting single cell point to multipoint (SC-PTM) data by a base station, the method comprising:
transmitting SC-PTM configuration information comprising (i) a plurality of group identifiers, (ii) information on physical resource block (PRB) sets and (iii) subframe set information of each of the plurality of group identifiers,
wherein the PRB sets are related to the plurality of group identifiers, respectively, and
wherein the PRB sets are differently located in a frequency domain, respectively;
transmitting, on a first PRB set among the PRB sets, a first downlink control channel related to a first group identifier among the plurality of group identifiers based on the SC-PTM configuration information; and
transmitting, on a first downlink data channel, data of a multimedia broadcast/multicast service (MBMS) session related to the first group identifier based on downlink control information carried by the first downlink control channel,
wherein the first downlink control channel is transmitted only in a first subframe set related to the first group identifier among a plurality of subframe sets, and
wherein the plurality of group identifiers is divided into G group identifier groups and a subframe set for each of the G group identifier groups is composed of subframes satisfying "G-RNTI" mod "G"="k" mod "G", where "G-RNTI" denotes a group identifier and "k" denotes a subframe number.

5. The method of claim 4, wherein the first PRB set related to the first group identifier is frequency hopped within the first subframe set related to the first group identifier.

6. The method of claim 4, wherein each subframe in the first subframe set related to the first group identifier is divided into a control region and a data region in a time domain, and
wherein the first downlink control channel is transmitted in the data region.

7. A user equipment (UE) for receiving single cell point to multipoint (SC-PTM) data, the UE comprising:
a memory; and
at least one processor coupled with the memory,
wherein the at least one processor is configured to:
receive SC-PTM configuration information comprising (i) a plurality of group identifiers, (ii) information on physical resource block (PRB) sets and (iii) subframe set information of each of the plurality of group identifiers,
wherein the PRB sets are related to the plurality of group identifiers, respectively, and
wherein the PRB sets are differently located in a frequency domain, respectively;
receive, on a first PRB set among the PRB sets, a first downlink control channel related to a first group identifier among the plurality of group identifiers based on the SC-PTM configuration information; and
receive, on a first downlink data channel, data of a multimedia broadcast/multicast service (MBMS) session related to the first group identifier based on downlink control information carried by the first downlink control channel,
wherein the at least one processor is further configured to receive the first downlink control channel only in a first subframe set related to the first group identifier among a plurality of subframe sets, and
wherein the plurality of group identifiers is divided into G group identifier groups and a subframe set for each of the G group identifier groups is composed of subframes satisfying "G-RNTI" mod "G"="k" mod "G", where "G-RNTI" denotes a group identifier and "k" denotes a subframe number.

8. The UE of claim 7, wherein the first PRB set related to the first group identifier is frequency hopped within the first subframe set related to the first group identifier.

9. The UE of claim 7, wherein each subframe in the first subframe set related to the first group identifier is divided into a control region and a data region in a time domain, and
wherein the first downlink control channel is received in the data region.

10. A base station for transmitting single cell point to multipoint (SC-PTM) data, the base station comprising:
a memory; and
at least one processor coupled with the memory,
wherein the at least one processor is configured to:
transmit SC-PTM configuration information comprising (i) a plurality of group identifiers, (ii) information on physical resource block (PRB) sets and (iii) subframe set information of each of the plurality of group identifiers,
wherein the PRB sets are related to the plurality of group identifiers, respectively, and
wherein the PRB sets are differently located in a frequency domain, respectively;
transmit, on a first PRB set among the PRB sets, a first downlink control channel related to a first group identifier among the plurality of group identifiers based on the SC-PTM configuration information; and
transmit, on a first downlink data channel, data of a multimedia broadcast/multicast service (MBMS) session related to the first group identifier based on downlink control information carried by the first downlink control channel,
wherein the first downlink control channel is transmitted only in a first subframe set related to the first group identifier among a plurality of subframe sets, and
wherein the plurality of group identifiers is divided into G group identifier groups and a subframe set for each of the G group identifier groups is composed of subframes satisfying "G-RNTI" mod "G"="k" mod "G", where "G-RNTI" denotes a group identifier and "k" denotes a subframe number.

11. The base station of claim 10, wherein the first PRB set related to the first group identifier is frequency hopped within the first subframe set related to the first group identifier.

12. The base station of claim 10, wherein each subframe in the first subframe set related to the first group identifier is divided into a control region and a data region in a time domain, and
wherein the first downlink control channel is transmitted in the data region.

* * * * *